Nov. 19, 1935.   E. R. GILMORE   2,021,774
VIBRATION DETECTOR
Filed June 8, 1934
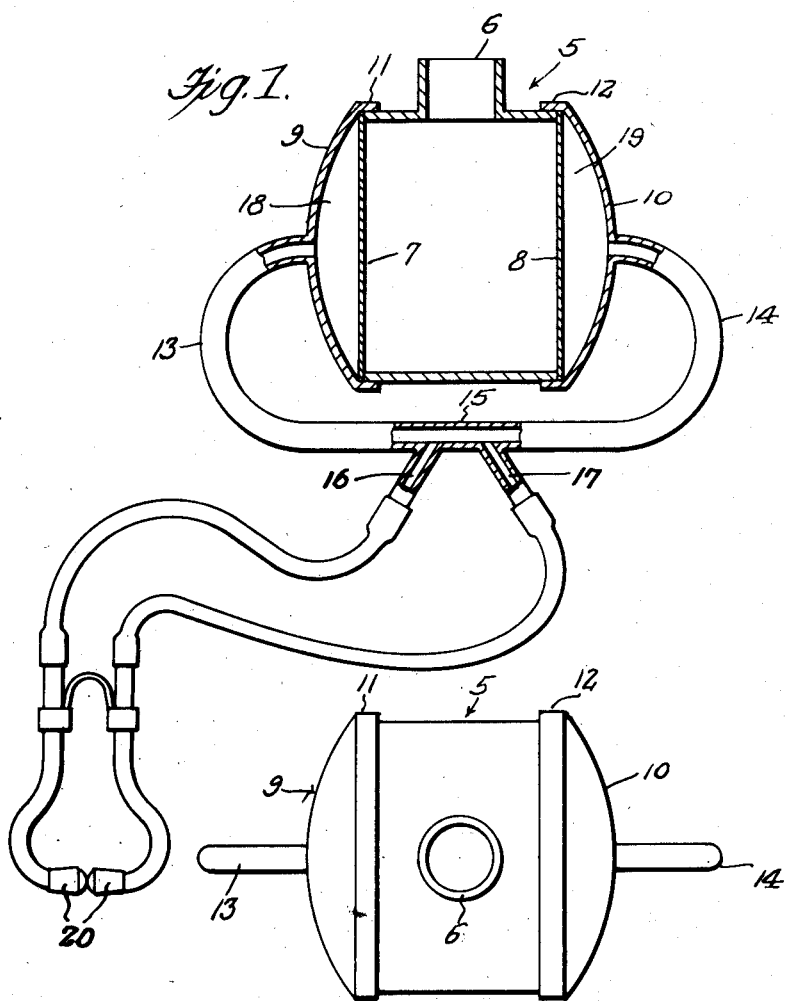
Inventor
*Edward R. Gilmore,*
By *Clarence A. O'Brien*
Attorney Patented Nov. 19, 1935

2,021,774

UNITED STATES PATENT OFFICE 2,021,774

VIBRATION DETECTOR

Edward R. Gilmore, Topeka, Kans.

Application June 8, 1934, Serial No. 729,681

1 Claim. (Cl. 181—22)

My invention relates generally to devices for detecting and transmitting vibrations present in fluids and other media capable of vibrating, and an important object of my invention is to provide a simplified and more efficient device of this kind which is especially, but not necessarily, designed for use in connection with detecting and locating leaks in distribution or transmission pipe lines or containers, particularly gas pipe lines and containers.

Another important object of the invention is to provide a device of the character indicated which will pick up and transmit to a point outside of the pipe or container the vibrations present in the fluid in the container in such a way that the vibrations may be made perceptible to the hearing and capable of accurate recordation.

Another important object of my invention is to provide a method of detecting leaks of the character indicated by mechanical means of extreme simplicity and durability having few and inexpensive parts.

Other objects and advantages of my invention will be apparent from a reading of the following description in connection with the drawing, wherein for purposes of illustration I have shown a preferred embodiment of my invention.

In the drawing:—

Figure 1 is a longitudinal vertical sectional elevational view of the embodiment.

Figure 2 is a top plan view of Figure 1.

Referring in detail to the drawing, the numeral 5 refers generally to a cylindrical or other suitably formed housing which has at one side the radially outwardly arranged fluid inlet neck 6 to admit the gas or other fluid to the interior of the housing.

Opposite ends of the housing are closed by suitably responsive diaphragms 7, 8, which with the walls of the housing 5 form a chamber receiving and confining the fluid let thereinto from the container or pipe line being tested for leaks or other phenomena causing unusual vibrations in the fluid.

Outside of each diaphragm 7, 8, respectively, is a bell 9, 10, respectively, which is mechanically separated from its respective diaphragm and forms with the outer side of its corresponding diaphragm a chamber devoid of the gas present in the housing 5 and arranged to collect and magnify the vibrations set up therein by the vibration of the diaphragm. A convenient arrangement of the bells 9, 10 is that in which their flanges 11, 12, respectively, telescope onto the opposite ends of the housing 5 so that adjacent portions of the bells act to confine the diaphragms 7, 8 in place without any other necessary functional cooperation as far as the collection, magnification, and transmission of the vibrations is concerned.

Leading from the approximate center of each bell is a relatively small conduit 13, 14, respectively, these conduits being J-shaped and the standard portion of the J merging into one tube at the point generally designated 15 which is generally parallel to the axis of the housing 5 and located radially outwardly thereof in relatively close proximity to the outside thereof at a position which is approximately diametrically opposite the inlet neck 6, as shown in Figure 1, and also in Figure 2.

At opposite longitudinal sides of the point generally designated 15 are divergent branches 16, 17 which are arranged to have connected thereto or to only one of them, conventional means such as the stethoscope binaulars 20 as shown in Patent No. 1,015,163 granted to Fosgate on January 16, 1912 or the earpieces shown in Patent No. 1,140,827 granted to Hoppie on May 25, 1915 for rendering sensible the vibrations in the conduits 13, 14 which are the result of the magnification in the chambers 18 and 19 of the original vibration present in the gas or other fluid within the housing 5. It will be obvious that by shutting off one or the other of the branches 16, 17, by closing off one of the binaulars 20 different vibrations may be detected.

It is obvious that unusual vibrations in the fluid contained in the pipe line or container are caused by leaks and other special conditions and are readily distinguishable from the lesser or different vibrations usually present therein and are detected by their unusual character or strength by the means provided by me herein.

The device employed by me apart from the exemplary structure set forth herein is to provide for the confinement of a portion of the fluid in the pipe line or container suspected of leaking, the confinement being accomplished by confining the fluid in a chamber all fluid confining portions of which or only one or more confining portions of which are vibration responsive to the type of vibrations it may be desired to detect, and the provision of chambers confining air or other suitable fluid vibration transmitting medium in vibration receiving relation to the said portion, and conveying the medium carrying the resultant magnified vibrations to a point outside of the fluid container by means of tubing like that contained in the stethoscope binaulars illustrated herein and connected to the branches 16 and 17, or by other suitable means known in the art.

Although I have shown and described herein a preferred embodiment of my invention, it is to be definitely understood that I do not desire to limit the application of the invention thereto, and any change or changes may be made in materials and in structure and arrangement of parts, within the spirit of the invention and the scope of the subjoined claim.

What is claimed is:—

A device of the character described comprising a housing having a gas inlet arranged for connection to the main body of the gas in a container to be tested for leaks, said housing having a pair of opposed diaphragms arranged thereacross in spaced relation to each other and defining therebetween a chamber fed with gas by said inlet, the opposite side of each diaphragm closing off a portion of said housing so as to define a sound box for magnifying the vibrations impinged on said diaphragm by the gas in said chamber, and tubes connected to said sound boxes for use in conveying the magnified vibrations to the ears of a listener.

EDWARD R. GILMORE.